Patented Jan. 17, 1933

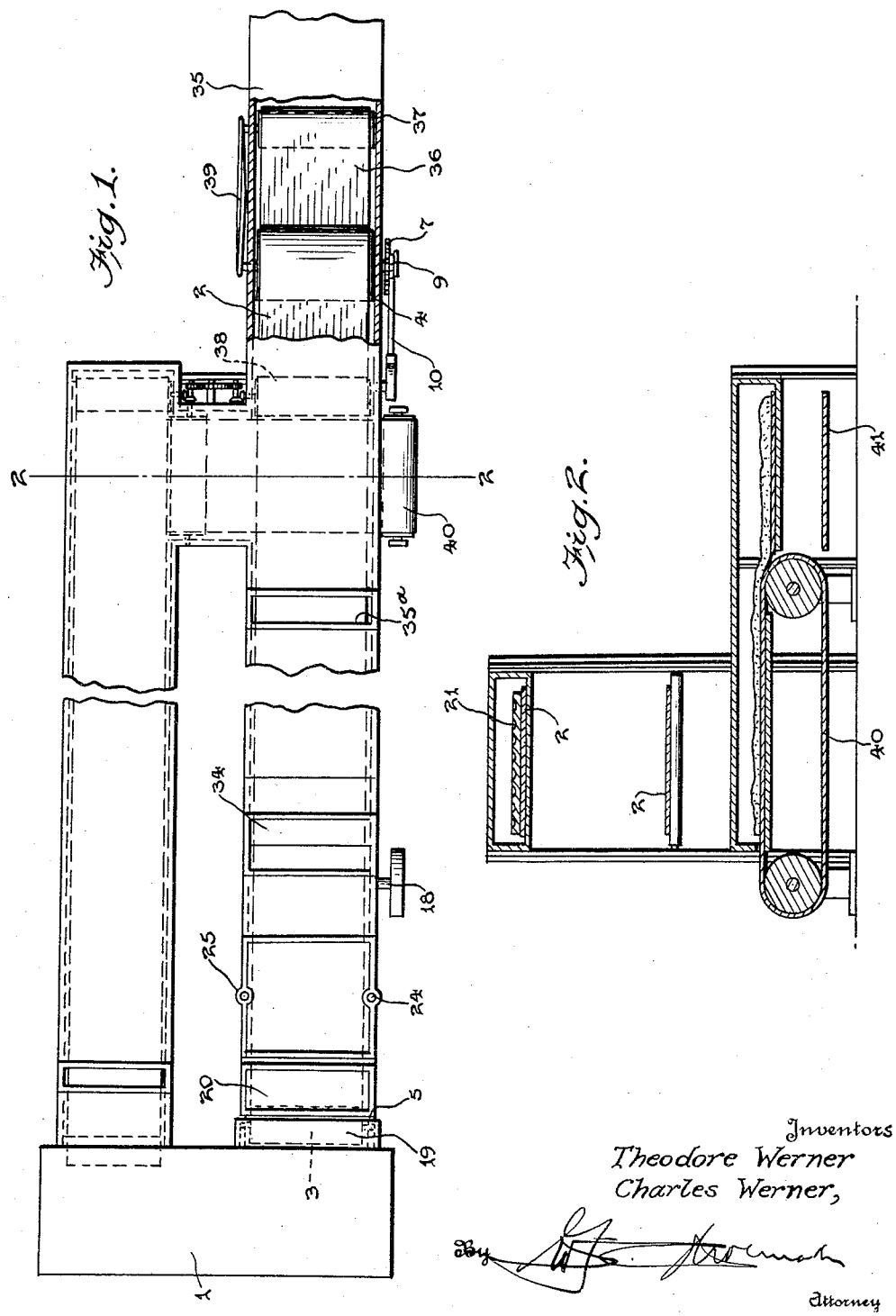

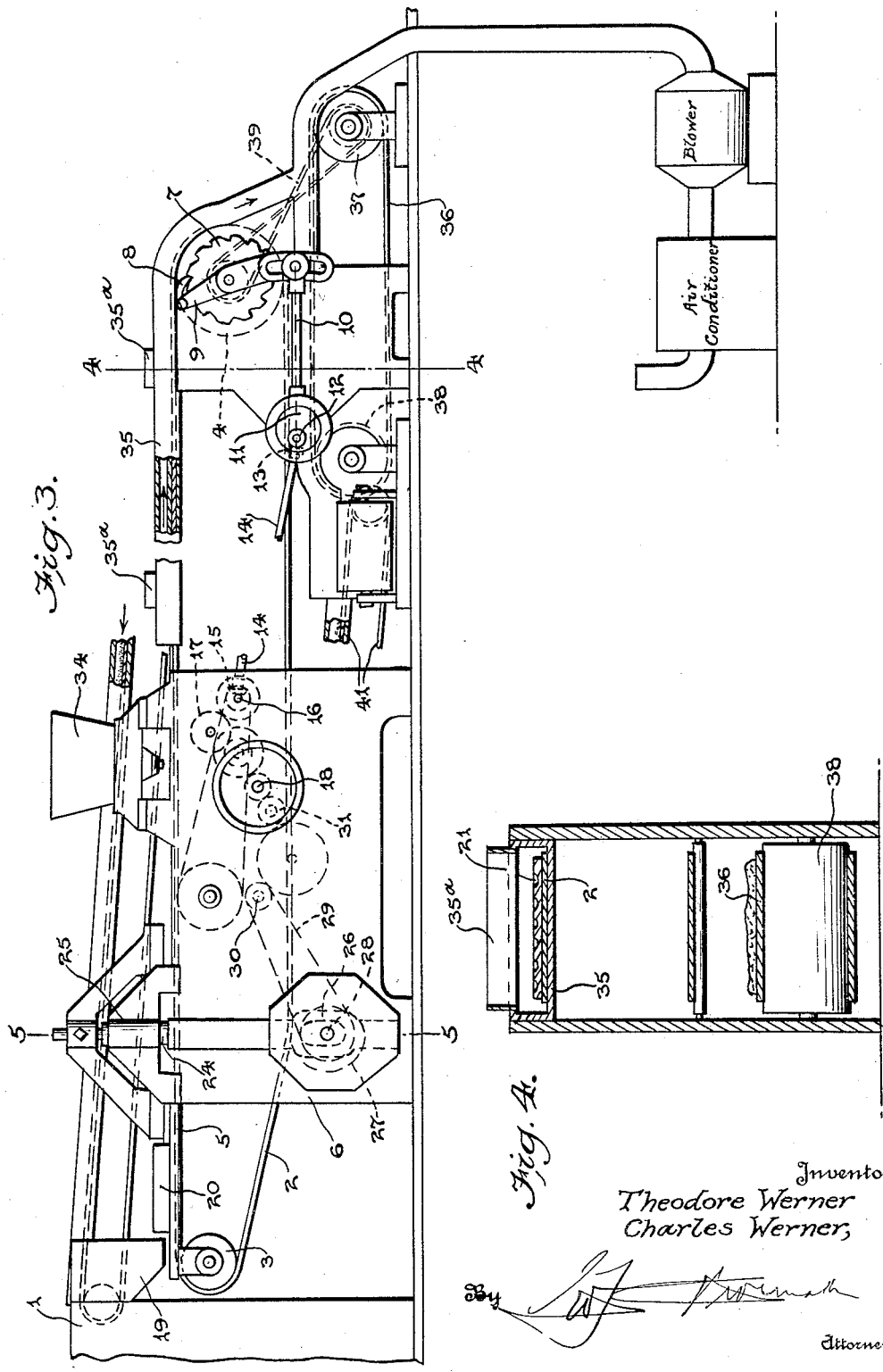

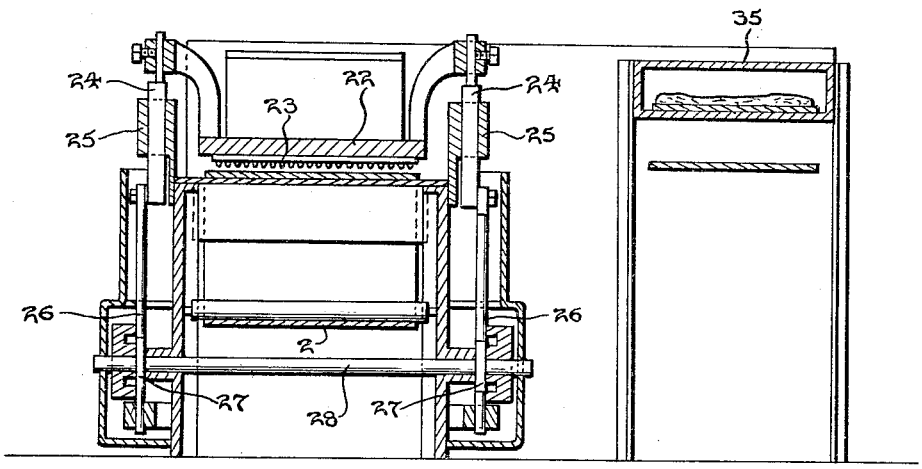
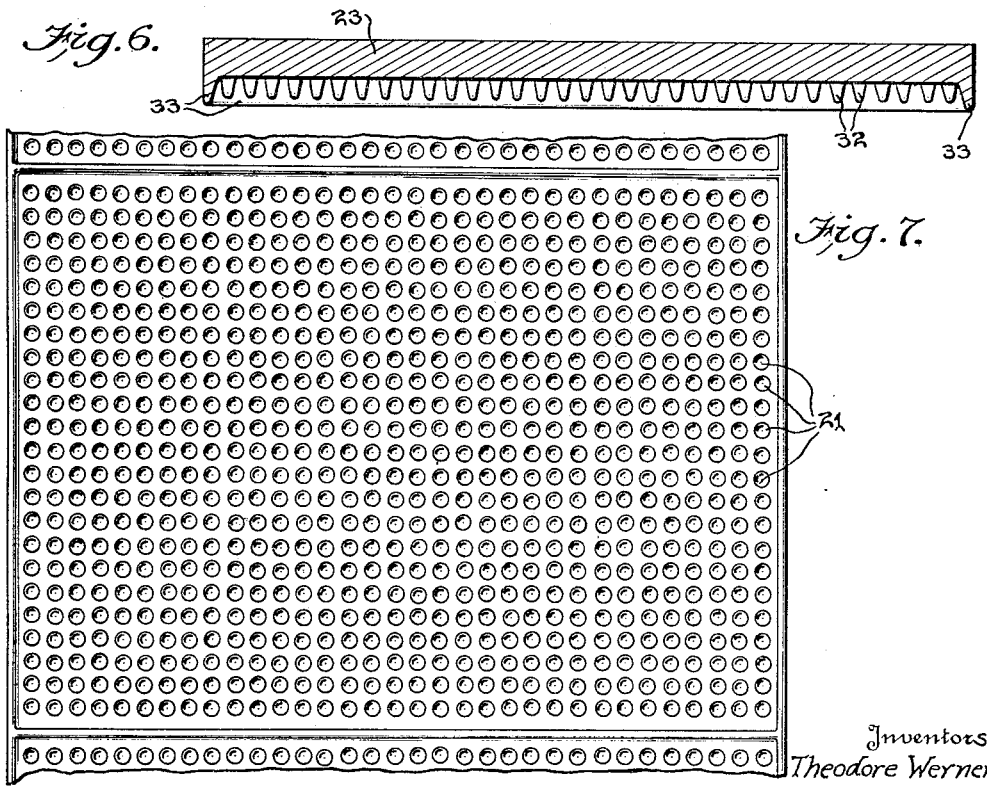

1,894,651

UNITED STATES PATENT OFFICE

THEODORE WERNER AND CHARLES WERNER, OF ROCHESTER, NEW YORK, ASSIGNORS TO JOHN WERNER & SONS, INC., OF ROCHESTER, NEW YORK, A CORPORATION OF NEW YORK

METHOD OF MOLDING CANDY CENTERS

Application filed August 13, 1931. Serial No. 556,866.

The invention relates to a method of molding candy centers.

The primary object of the present invention is to make it possible to produce candy centers in a much shorter period of time than heretofore by causing the candy centers or confections to set immediately by hastening the crystallization of the sugar of the candy at the surface of the molds and thereby case harden or skin harden the candy centers.

The confection is cast in starch or other comminuted material. The starch is contained and maintained constantly at a temperature ranging from 40° to 60° Fahrenheit. The prepared confection is then cast into the starch which has been previously imprinted to form molds for the candy centers, the temperature of the starch being maintained within the said range of temperatures while the molds are being formed. In the present invention the temperature of the starch, between 40° and 60° Fahrenheit, is below normal room temperature, and the new heat introduced into the starch by depositing the hot candy in the molds is constantly removed and the aforesaid temperature maintained until the candy centers are separated from the starch. This is accomplished by means of a current of cold air and cold jacketed plate conveyors when necessary.

This method hastens the casting and handling and reduces the long tortuous travel of the candy centers which would otherwise be necessary in order to properly set the same. The cold starch is placed underneath the depositing device, which drops the confection into the molds, and the hot candy, from three to five times hotter than the starch, is cast into the imprints in the starch. The hot candy coming in contact with the cold starch hastens the crystallization of the sugar of the candy at the surface of the molds and forms a case hardening or crust on the confection or candy that in no way dries the candy center but in fact traps the vapor or moisture within the same, and tests have proved that by the present process a greater percent of moisture is retained in the candy than heretofore.

This is, of course, an object and advantage of the invention. The process neither dries nor matures the centers by having the hot confection cast in the cold starch, but simply hastens crystallization and quickly forms a case hardening or crust which permits handling of the candy or confection much sooner than heretofore has been possible. By constantly maintaining the starch at a temperature within the range of 40° to 60° Fahrenheit, the cooled starch mold immediately forces the crystallization of the sugar of the confection at the surfaces of the mold and produces an immediate setting of the candy centers.

While various constructions of apparatus may be employed for carrying out the process of the present invention, a satisfactory apparatus for this purpose is illustrated in the accompanying drawings.

In the drawings:

Figure 1 is a plan view of a machine for molding candy centers.

Fig. 2 is a section on the line 2—2 of Fig. 1.

Fig. 3 is a side elevation of the candy molding machine.

Fig. 4 is a section on the line 4—4 of Fig. 3.

Fig. 5 is a section on the line 5—5 of Fig. 3.

Fig. 6 is an enlarged section through the printing member.

Fig. 7 is a fragmentary plan view of the endless belt after the molding material has been deposited on the belt and has been printed.

In the machine illustrated in the accompanying drawings, 1 designates a starch buck (a machine of known construction), which receives the starch and candy and separates the two. From the starch buck 1 the starch passes to an endless carrier on which it is printed or shaped to provide the molds, and in this instance the endless carrier is in the form of a belt 2 which passes about a pulley 3 at the front forward end of the machine, and about a pulley 4 at the rear end of the machine. The upper lap of the belt travels over a table 5 arranged on the frame 6. The endless belt in this instance advances by a step by step movement, which is preferably effected by providing a toothed wheel 7 on the shaft of the pulley 4 and engaging said wheel with a pivoted pawl 8 on a swinging member 9 turning about the axis of rotation of the wheel 7. This swinging member 9 is moved by a pitman 10 which connects with an eccentric 11 on the shaft 12. The latter is driven through a beveled gearing 13 from a shaft 14 which connects by a beveled gearing 15 with a shaft 16. The shaft 16 through a gearing 17 connects with the drive shaft 18. The starch from the starch buck 1 is deposited on the endless carrier by means of the discharge spout 19 and is leveled on the belt by a leveling device 20 of any suitable construction.

From the leveling device the starch containing portion of the belt passes to the printing machine which will compress the starch and form mold pockets 21 therein. This printing or mold forming mechanism in this instance embodies a head 22 carrying the printing device 23 and supported at opposite sides by guide rods 24 movable in fixed guides 25. The guide rods have adjacent their lower ends yokes 26 which operate by cams 27 on a shaft 28 which by a belt 29 operates from a shaft 30, the latter through a gear 31 connects with the drive shaft 18.

The printing member in this instance is a flat plate provided on the under side thereof with a plurality of projections 32 and a surrounding marginal flange 33, the inner wall of which converges inwardly. This flange extends beyond the ends of the projections 32, so that it will engage the leveled starch in advance of the projections and will prevent the starch spreading as the molding projections are being forced into the starch, thus giving to the molded starch a compressed condition.

The belt or carrier now moves the molded starch to the candy depositor 34, which deposits hot candy for the centers into the mold pockets of the starch.

At the time the candy is deposited in the starch, the conditioned starch has a temperature below ordinary room temperature and within the said range of 40° to 60° Fahrenheit. The candy and starch together now travel on the endless carrier 2 and through a conditioning means which removes the new heat added by the hot candy and constantly maintains the starch at a temperature within the said range of between 40° and 60° Fahrenheit. This conditioning means, which may be of any preferred construction, comprises a housing or casing 35 which surrounds the endless carrier and extends from the depositor beyond the discharge end of the endless carrier, but it may be of any desired length and extend in advance of the depositor.

Cold air is circulated through this conditioning means and displaces air heated by the hot candy, the heated air rising and passing off through suitable air ducts 35ª located at and extending upwardly from the top of the housing or casing. Any number of the air ducts may be employed, and the cold air of the conditioning means is of a sufficiently low temperature to maintain the starch constantly at a temperature between 40° and 60° Fahrenheit. A hot candy contacting with the cold walls of the mold pockets of the starch sets immediately, the cold starch molds operating to hasten the crystallization of sugar and the formation of a hard skin or crust which covers the candy centers, retaining the moisture within the candy centers and preventing the interior of the candy centers from drying or maturing, as heretofore explained. The candy and cold starch or other comminuted molding material travel together through the conditioner to the discharge end of the endless carrier 2 when the candy and starch are jumbled or mixed together in falling upon an endless carrier 36 which lies directly beneath the endless carrier 2 within the casing 35 of the conditioning means, the receiving end of the endless carrier 36 being projected beyond the discharge end of the carrier 2. This endless carrier 36 passes around two pulleys 37 and 38 and is driven from the shaft of the pulley 4 by a belt 39.

The candy and starch jumbled together return on the carrier 36 towards the front end of the machine until a transversely operating carrier 40 is reached, when the jumbled material is deposited on the carrier 40, which moves the material toward and onto another endless carrier 41 which extends longitudinally of and at one side of the carrier 2. This carrier 41 carries the jumbled candy and starch upwardly and forwardly and deposits them onto the intake of the starch buck 1, which separates the candy from the starch and returns the starch to the endless belt 2. The endless carriers 2, 36, 40 and 41 travel preferably at the same surface speed and all are preferably enclosed in the casing of the conditioning means so as to be subjected to the conditioning air which also is effective in the starch buck due to the connection of the latter with the casing. This enables the starch to be constantly maintained at a temperature within the said range of 40° to 60° Fahrenheit.

The invention makes it possible to mold candy centers at less cost and in less time than heretofore, and at the same time produces candy centers containing a greater amount of moisture than heretofore and without any maturing action on the material of the candy centers within the enclosing skin or crust. The conditioning means conditions the starch both as to temperature and moisture before the candy is deposited in the mold pockets and constantly conditions the starch both as to temperature and moisture, after the candy has been deposited in the mold pockets so that the starch will be maintained constantly at a temperature within the range of 40° to 60° Fahrenheit and at normal moisture condition so that the cold molding material will not remove any of the moisture from the hot candy but will operate to immediately set the candy centers and trap the moisture thereof, whereby the candy centers after setting will contain a greater amount of moisture than heretofore.

By the process of the present invention the inside of a confection retains its soft texture and its moisture and merely the outside becomes case hardened or skin hardened so that it will stand handling and chocolate dipping, crystallization, sanding or shipping.

What is claimed is:

1. The method of quick setting candy centers in comminuted material consisting in conditioning the material so that it has a temperature within the range of 40° to 60° Fahrenheit, depositing hot candy in said material to form candy centers, and maintaining the comminuted material constantly at a temperature within the said range to force or hasten crystallization of the sugar of the candy centers to cause the same to set immediately and case harden or skin harden so that the candy may be removed from the comminuted material in a short period of time.

2. The method of quick setting candy centers in comminuted material consisting in conditioning the comminuted material so that it has a temperature within the range of 40° to 60° Fahrenheit, depositing hot candy in the said temperature conditioned material to form candy centers, subjecting the comminuted material with the candy therein to an atmosphere of air sufficiently cold to maintain the said comminuted material constantly at a temperature within the said range, whereby the said candy centers are caused to set immediately and force crystallization of the sugar of the candy centers, and case harden or skin harden the confection so that the candy centers after being deposited in the comminuted material may be quickly removed therefrom.

3. The method of quick setting candy centers in comminuted material consisting in conditioning the comminuted material so that it has a temperature within the range of 40° to 60° Fahrenheit, depositing hot candy in the said temperature conditioned material to form candy centers, circulating cold air about the comminuted material at a temperature sufficiently low to maintain the comminuted material with the candy centers therein constantly at a temperature within the said range, whereby the said candy centers are caused to set immediately so that the candy centers after being deposited in the comminuted molding material may be quickly removed therefrom.

4. The method of quick setting candy centers in comminuted material consisting in conditioning the comminuted material so that it has a temperature within the range of 40° to 60° Fahrenheit, depositing hot candy in the said temperature conditioned material to form candy centers, removing from around the comminuted material air heated by the hot candy, and circulating cold air about said comminuted material at a temperature sufficiently low to maintain the said comminuted material constantly within the range of 40° to 60° Fahrenheit, whereby crystallization of sugar is forced and the candy centers caused to set immediately so that they may be removed from the molding material within a short period of time.

5. The method of quick setting candy centers in comminuted material consisting in conditioning the comminuted material both as to temperature and moisture so that the said material has a temperature within the range of 40° to 60° Fahrenheit, depositing hot candy in the comminuted material to form candy centers, removing from around the said material air heated by the hot candy, subjecting the comminuted material to cold air conditioned as to moisture and temperature and of a sufficiently low temperature and of sufficient moisture content to maintain the comminuted material constantly at a temperature within the said range and with a normal moisture content, whereby the candy centers are caused to set in a much shorter time than heretofore and at the same time are caused to retain within the candy centers a greater amount of moisture, perfume and other volatile material than has heretofore been possible.

In testimony whereof we have hereunto set our hands this 6th day of August, 1931.

THEODORE WERNER.
CHARLES WERNER.